United States Patent [19]

Kobayashi et al.

[11] Patent Number: 4,757,551
[45] Date of Patent: Jul. 12, 1988

[54] CHARACTER RECOGNITION METHOD AND SYSTEM CAPABLE OF RECOGNIZING SLANT CHARACTERS

[75] Inventors: Kiyohiko Kobayashi, Yamato; Akira Sakurai, Kawasaki; Gen Sato, Kamifukuoka, all of Japan

[73] Assignee: Ricoh Company, Ltd., Tokyo, Japan

[21] Appl. No.: 915,285

[22] Filed: Oct. 3, 1986

[30] Foreign Application Priority Data

Oct. 3, 1985 [JP] Japan .................... 60-220973

[51] Int. Cl.⁴ .................... G06K 9/46; G06K 9/48
[52] U.S. Cl. .................... 382/18; 382/21
[58] Field of Search .................... 382/9, 13, 16, 18, 21, 382/22, 30, 34

[56] References Cited

U.S. PATENT DOCUMENTS 3,609,685 9/1971 Deutsch .................... 382/21

FOREIGN PATENT DOCUMENTS 58-214974 12/1983 Japan .................... 382/18
61-125688 6/1986 Japan .................... 382/21

OTHER PUBLICATIONS

Glucksman; "Multicategory Classification of Patterns Represented by High-Order Vectors of Multilevel Measurements"; IEEE Transactions on Computers; 12-1971, pp. 1593-1598.

Primary Examiner—James J. Groody
Assistant Examiner—Michael D. Parker
Attorney, Agent, or Firm—Mason, Fenwick & Lawrence

[57] ABSTRACT

A character recognition system includes a scanner for scanning a character to be processed to produce a character data, which is processed in a predetermined manner to extract a character feature, preferably contour information of the character. Preferably, a plurality of predetermined directionality codes each associated with a unique pixel arrangement pattern are prepared and they are assigned to the contour depending on the local pixel arrangement condition. The contour information defined by such directionality codes is further processed to define a histogram or feature vector of the directionality codes which is compared with a first group of reference characters without inclination and a second group of reference characters with inclination. When a predetermined condition is met, then the mode of operation is switched such that an unknown character is compared with only one of the first and second groups of reference characters.

16 Claims, 16 Drawing Sheets

| PATTERN | | | | | | | | |
|---|---|---|---|---|---|---|---|---|
| CODE | 0 | 1 | 2 | 5 | 3 | 0 | 6 | 0 |

| PATTERN | | | | | | | | |
|---|---|---|---|---|---|---|---|---|
| CODE | 4 | 8 | 0 | 0 | 7 | 0 | 0 | 0 |

CHARACTER RECOGNITION METHOD AND SYSTEM CAPABLE OF RECOGNIZING SLANT CHARACTERS

BACKGROUND OF THE INVENTION

1. Field of the Invention

This invention relates to a character recognition system for recognizing characters, such as letters and numerals, and, in particular, to a character recognizing system for recognizing handwritten characters. More specifically, the present invention relates to a character recognizing system capable of recognizing even slant characters.

2. Description of the Prior Art

A character recognizing apparatus is well known in the art and it is often called an optical character reader or simply OCR. In such a character recognizing apparatus, a character to be identified is first optically scanned to define a character pattern which is then compared with a library storing a plurality of reference character patterns. One of the difficulties encountered in recognizing an unknown character is that characters are sometimes slant especially when it is a handwritten character. The degree of inclination of handwritten character varies from person to person, which makes it difficult to recognize characters automatically by a character recognition system. Thus, in the prior art character recognition system, people were asked to write characters to be recognized without inclination as much as possible. However, such a constraint makes the character recognition system rather unattractive.

It is true that characters handwritten by some people are slant, but it is also true that the degree of inclination of handwritten characters is characteristic of personality, so that one person tends to write characters with substantially the same degree of inclination. It is thus expected that the recognition of slant characters, especially handwritten characters, can be significantly improved if the character recognition system is so structured by taking this fact into account.

SUMMARY OF THE INVENTION

It is therefore a primary object of the present invention to provide an improved character recognizing method and system having a high rate of recognition.

Another object of the present invention is to provide an improved character recognizing system capable of recognizing characters, such as letters and numerals, even if they are inclined.

A further object of the present invention is to provide an improved character recognizing system capable of recognizing handwritten characters at high accuracy and high speed.

Other objects, advantages and novel features of the present invention will become apparent from the following detailed description of the invention when considered in conjunction with the accompanying drawings.

BRIEF DESCRIPTION OF THE DRAWINGS

FIG. 1 is a block diagram showing a character recognition system constructed in accordance with one embodiment of the present invention;

FIG. 4 is a schematic illustration showing one example of a pattern data of directionality codes when processed for numeral "7" without inclination;

FIG. 5 is a schematic illustration showing another example of a pattern data of directionality codes when processed for numeral "7" with inclination;

FIG. 9 is a schematic illustration showing a set of directionality codes and associated pixel patterns for processing the white pixels located at the contour of a character to be recognized;

FIG. 11 is an illustration showing the pattern of katakana "a" after assigning an appropriate one of the directionality codes to each of the black pixels defining the contour of pre-processed katakana "a";

FIG. 12 is similarly an illustration showing the pattern of katakana "a" after assigning an appropriate one of the directionality codes to each of the white pixels defining the contour of the pre-processed katakana "a";

FIG. 16 is an illustration showing the result of subdivision of the katakata character "nu" after having been subdivided by the process shown in FIG. 15;

FIG. 18 is an illustration showing the result of subdivision of the katakana character "nu" after having been subdivided by the process shown in FIG. 17.

DESCRIPTION OF THE PREFERRED EMBODIMENTS

Figure 2:
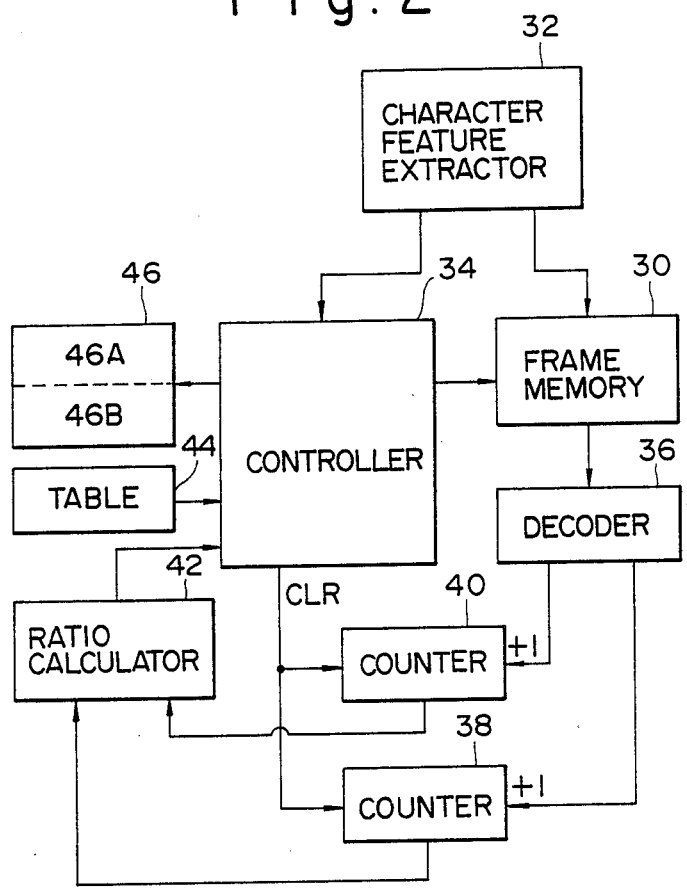
FIG. 2 is a block diagram showing a system for forming a character library for use in character recognition constructed in accordance with another embodiment of the present invention.

Referring now to FIG. 1, there is shown in block form a character recognition system constructed in accordance with one embodiment of the present invention. As shown, the system includes a scanner 10 for optically scanning a document having thereon characters, such as letters and numerals, for example by a CCD, thereby converting visual character information into electrical character information. An image signal representing the electrical character information thus produced by the scanner 10 is then supplied to a binary conversion and noise elimination unit 12, where the image signal is subjected to thresholding processing, so that the character portion is now represented by one of the binary number with the background portion being represented by the other of the binary number. At the same time, noise components, such as isolated spots in the background area which are often observed if the document scanned is a copy sheet, are eliminated. There are several ways to carry out noise elimination. For example, the threshold level may be adjusted so as to minimize the occurrence of noise or the isolated spots or pixels may be eliminated using a 3-by-3 pixel window. The 3-by-3 pixel window includes nine pixel elements arranged three rows and three columns with the center pixel element being a pixel of interest. And, if the eight peripheral pixel elements have been found to indicate black with the center pixel element indicating black, then the center pixel element is regarded as an isolated spot which has nothing to do with character information, and, thus, eliminated.

The binary converted image data with elimination of noise is then supplied to a character search unit 14, where individual character data are identified and sent to a character feature extraction unit one by one. That is, the image data in the binary representation includes, for example, "1s" representing character portions and "0" representing background portions, and, thus, each of the characters in the image data in binary representation may be identified by scanning the image data vertically as well as horizontally. Each of the character data thus identified is then supplied to a character feature extraction unit 16 which extracts a feature of the predetermined type from the character data. There are several character features to be extracted; however, in the present embodiment, the contour of each character is used as a feature to be extracted. Thus, in accordance the present embodiment, the contour of each of the characters is first determined and processed to determine a feature vector therefrom in a predetermined manner. The resultant feature vector is then supplied to a comparator 18 for comparison with a plurality of reference feature vectors stored in a character library for determination of identification of the character data thus supplied to the comparator 18.

In accordance with the present embodiment, the system includes a pair of libraries 20A and 20B, whereby the library I 20A stores a plurality of reference feature vectors for characters without or substantially without inclination and the other library II 20B stores a plurality of reference feature vectors for characters with inclination. It is to be noted that the libraries 20A and 20B may be comprised of two separate memories or a single memory with two distinctive memory areas for characters without inclination and characters with inclination. Thus, when the libraries 20A and 20B are defined on the same memory, they must be defined in separate continuous address spaces, such that they are logically separate from each other, thereby allowing to be handled as separate libraries when viewed from the comparator 18.

As will be made clear later, the present system includes two modes of operation: (1) first mode of operation in which the character recognition operation is carried out using both of the two libraries 20A and 20B and (2) second mode of operation in which only one of the two libraries 20A and 20B is used. In order to effect switching between these two modes of operation, the system is provided with a mode control unit 22 as operatively coupled to the comparator 18. Also provided in the system is a pair of counters 24A and 24B which correspond to the libraries 20A and 20B in function. These counters 24A and 24B are coupled to the comparator 18, and each of the counters 24A and 24b is incremented by the comparator 18 depending on which of the corresponding libraries is used for comparison during the first mode of operation. Under a predetermined condition, the counts of the respective counters 24A and 24B are compared and then it is determined as to which of the libraries 20A and 20B is to be used when switched to the second mode of operation by the mode control unit 22.

In operation, the mode control unit 22 initially sets the mode of operation of the present system in the first mode of operation. It should also be noted that the library 20A stores a collection of feature vectors for characters without inclination and the library 20B stores a collection of feature vectors for characters with inclination. In this connection, it should also be noted that such character libraries 20A and 20B may be formed by using the present system with a slight modification. That is, in this case, the present system should be so modified that it has a registration mode and a recognition mode. And, when the system is set in the registration mode, various characters to be stored are scanned and processed to form feature vectors which are stored into the corresponding one of the libraries 20A or 20B through the comparator 18 without comparison operation. In this case, since it is known that the characters to be scanned are inclined or not, it is so set the the corresponding feature vector data is to be stored into one of the libraries 20A and 20B appropriately. In this manner, the system becomes equipped with the library 20A for characters without inclination and the library 20B for characters with inclination.

When a document bearing thereon characters to be recognized is scanned by the scanner 10, the character data thus read is subjected to binary conversion and the binary data of each character is searched and processed to determine its feature, or contour in the present embodiment. In the determination of the contour of a character, use is preferably made of a plurality of predetermined directionality codes as will be described more in detail later. Upon determination of the feature, or contour in the present embodiment, a feature vector is calculated in accordance with a predetermined manner. The feature vector thus calculated is then supplied to the comparator 18. Since the comparator 18 is set in the first mode of operation by the mode controller 22, the feature vector of an unknown character thus supplied from the feature extraction unit 16 is compared with feature vectors of known characters stored in both of the libraries 20A and 20B. And, then, the similar feature vector having the maximum degree of similarity to the input feature vector among those stored in the libraries 20A and 20B is selected and is output as the result indicating the identity of the unknown character. In this case, if the similar feature vector has been found in the library 20A, then the count of the corresponding counter 24A is incremented by +1; whereas, if it has been found in the other library 20B, then the count of the corresponding counter 24B is incremented by +1. It should be understood that both of the counters 24A and 24B are cleared prior to the initiation of the character recognition operation. In this manner, as character recognition takes place one after another, the count of each of the counters 24A and 24B increases each time when the similar feature vector has been found in the corresponding library 20A or 20B. Thus, the count of each of the counters 24A and 24B indicates the frequency of finding similar feature vectors from the corresponding library 20A or 20B at a particular point in time.

The mode control unit 22 constantly monitors the difference between the counts of the counters 24A and 24B, and when this difference has exceeded a predetermined value, the mode control unit 22 supplies a second mode command signal to the comparator 18, so that the comparator 18 is now set in the second mode of operation, and, at the same time, designates one of the libraries 20A and 20B to be used exclusively in the second mode of operation corresponding to that counter 24A or 24B which has a higher count between the two. Thus, from now on, the comparator 18 operates in the second mode and the character recognition operation takes place only using the selected one of the libraries 20A and 20B. As briefly stated before, the degree of inclination of handwritten characters differs significantly from person to person, but such a degree of inclination stays almost the same for a particular person. Thus, the degree of inclination of handwritten characters is a characteristic of an individual or a group of individuals. Thus, even if the present system is switched to the second mode of operation, which uses only one of the libraries 20A and 20B, there is virtually no degradation in the rate of correct character recognition. In addition, since the reference is made only to one of the two libraries 20A and 20B, the time needed to execute comparison is significantly reduced, or halved in the present embodiment, the speed of character recognition is also significantly increased.

In the above-described embodiment, it is so structured that switching into the second mode of operation is effected when the difference between the counts of the counters 24A and 24B has exceeded a predetermined value. However, as an alternative structure, it may also be so structured that switching into the second mode of operation is effected upon completion of a predetermined number of character recognition operations, for example a few or a few tens of character recognition operations. In this case also, when entering into the second mode of operation, one of the libraries 20A and 20B corresponding to the counter 24A or 24B having a higher count at that time is selected and used exclusively in the second mode of operation. Furthermore, in the above-described embodiment, characters are classified between those with inclination and those without inclination. However, characters with inclination may be further classified in two or more categories depending on the degree of inclination. In this case, there are produced three or more libraries each associated with a particular degree of inclination of characters.

Another embodiment of the present invention will now be described. Since this embodiment has an overall structure similar to the previously described embodiment, reference is again made to FIG. 1. In this embodiment, when the comparator 18 is operating in the first mode of operation using the two libraries 20A and 20B for identification of an input character information, the comparator 18 locates a best fit character having the best degree of similarity as in the above-described embodiment and also a second best fit character having the second best degree of similarity. If the best and the second best fit characters have been found from the different libraries 20A and 20B, then both of the counters 24A and 24B are incremented by +1 at the same time. On the other hand, if both of the best and the second best fit characters have been found from the same library 20A or 20B, then the count of the corresponding counter 24A or 24B is incremented by +2.

In accordance with a further embodiment of the present invention, when the best and the second best fit characters have been found in the different libraries 20A and 20B during the first mode of operation, the comparator 18 calculates a difference between an input character and each of the best and the second best fit characters, whereby if the calculated difference is larger than a predetermined value, then the amount of incrementing the count of each of the counters 24A and 24B is increased correspondingly in a manner similar to the case where both of the best and the second best fit characters have been found in the same library as described previously.

In accordance with a still further embodiment of the present invention, an output data (character code or reject code) from the comparator 18 are supplied to the mode control unit 22. And, in the case when rejection of comparison has taken place during the second mode of operation and thus a reject code has been output from the comparator 18, the mode control unit 22 causes the mode of operation to return to the first mode and the counters 24A and 24B to be cleared. The subsequent operation is similar to that previously described.

Figure 3:
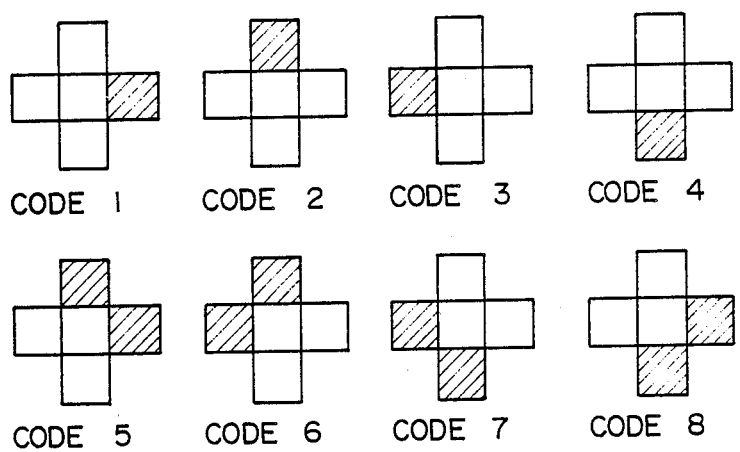
FIG. 3 is a schematic illustration showing a plurality of directionality codes employed in the system shown in FIG. 2.

Referring now to FIG. 2, there is schematically shown in block form a system for forming character libraries for use in character recognition constructed in accordance with another aspect of the present invention. The present character library forming system is suitable for use in a character recognition system of the type described above, in which one of a plurality of predetermined directionality codes is selectively assigned to each pixel of the contour of an input character to be identified and a histogram of the directionality codes is determined for each of regions defined by subdividing a character frame of the character to be identified, followed by the step of identifying the input character utilizing the histograms as feature vector or parameters. As shown in FIG. 2, the present character library forming system includes a frame memory 30 for storing the data of one character to be registered. The frame memory 30 is connected to a character feature extractor 32 which corresponds to the block 16 in the charactert recognition system of FIG. 1. When the binary data of one character in a predetermined frame is supplied to the unit 32, one of a plurality of predetermined directionally codes 1 through 8 as shown in FIG. 3 is assigned to each of contour pixels of the character to be processed. Since the character is typically black and writtern on a white sheet of paper, the contour pixels are usually white pixels.

In the case of the directionality codes shown in FIG. 3, each code has a unique pixel arrangement pattern comprised of five pixels including a center pixel as a pixel of interest corresponding to one of the contour pixels of the character to be processed, a pair of top and bottom pixels, and another pair of left and right pixels. Each code differs depending on which of the peripheral or adjacent pixels is black in color. For example, code 1 has an arrangement pattern whose right-hand pixel is black. The arrangement pattern for code 5 has its top and right-hand pixels which are black and the arrangement pattern for code 7 has its bottom and left-hand pixels which are black. Thus, codes 5 and 7 indicate that the corresponding portion of the character contour is inclined rising to the right. On the other hand, the top and left-hand pixels are black in the arrangement pattern of code 6 and the bottom and right-hand pixels are black in the arranement pattern of code 8. Thus, codes 6 and 8 indicate that the corresponding portion of the character contour is inclined as rising to the left. These codes 6 and 8 are inclination directionality codes indicating the inclination of a character, and they are used in determination of presence of inclination in a character to be identified.

Figure 4:
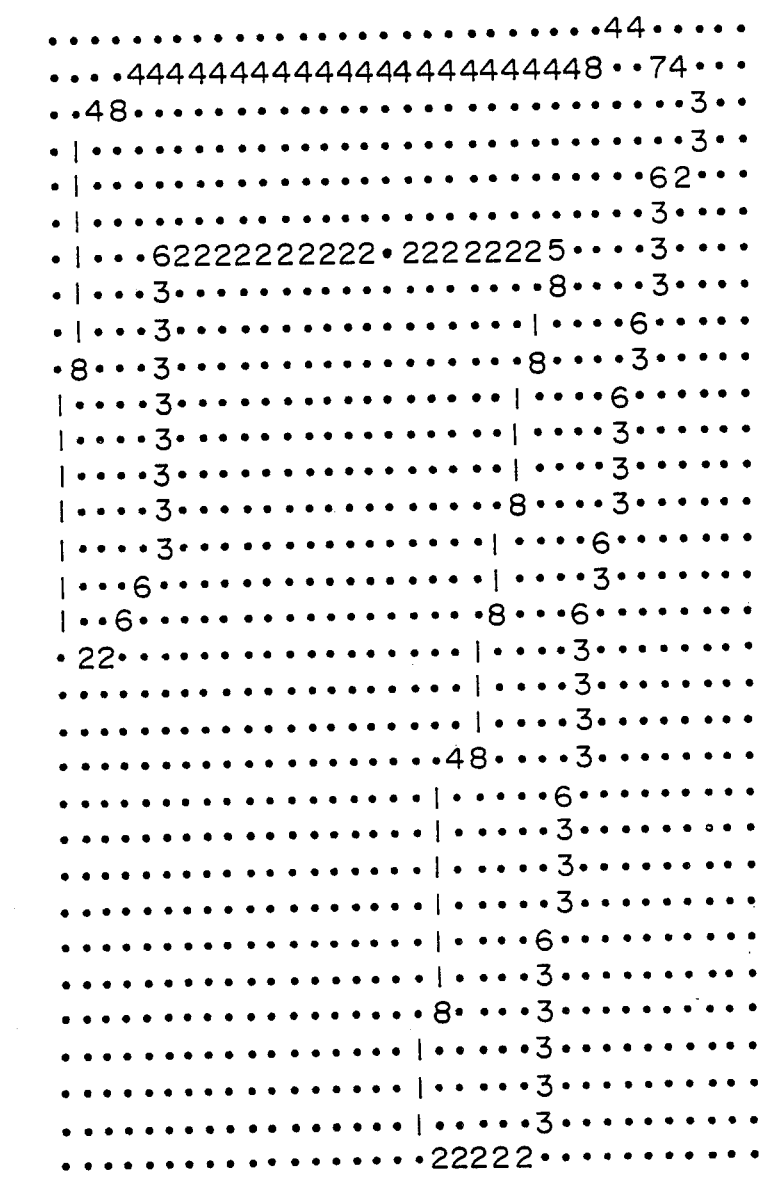
Figure 5:
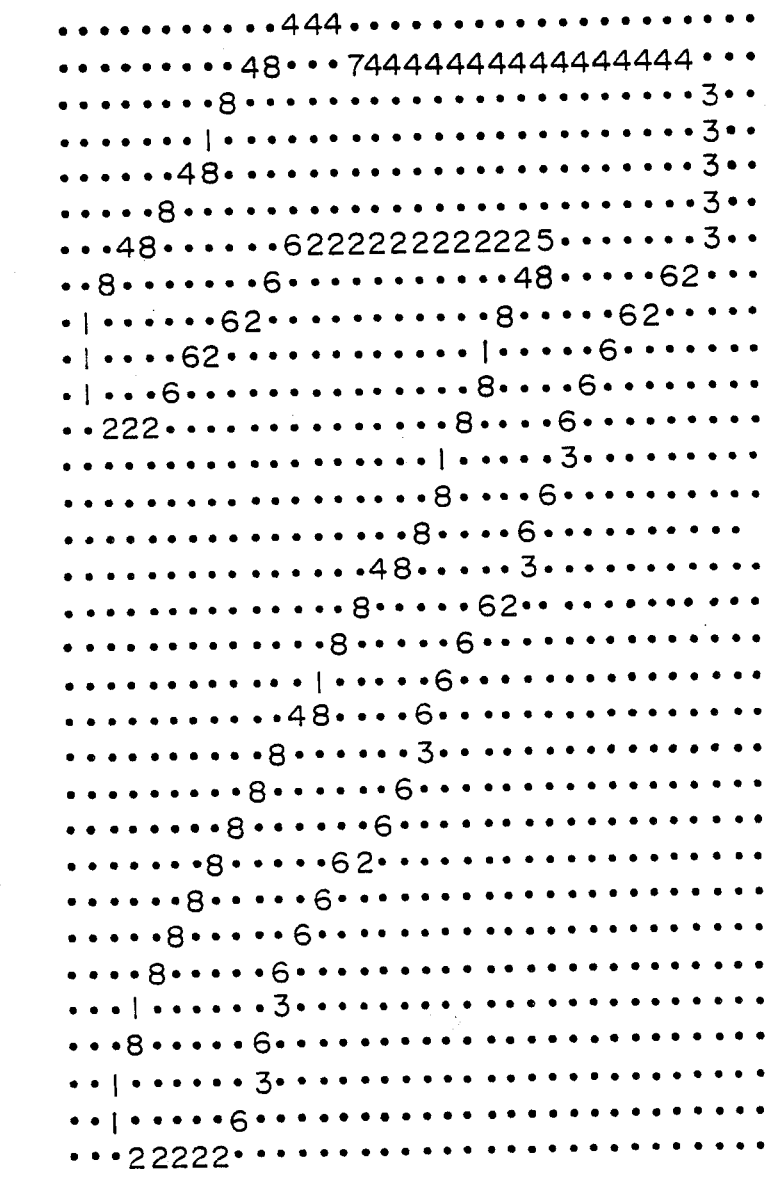

FIGS. 3 and 4 illustrate arrangements of the directionality codes shown in FIG. 3 after assigning the directionality codes to the contour pixels of numeral "7" without inclination and numeral "7" with inclination, respectively. When comparing the arrangments shown in FIGS. 4 and 5, one immediately understands that an increased number of codes 6 and 8 are found in the arrangment of FIG. 5 as compared with the arrangement pattern of FIG. 4. Such an arrangement pattern is stored into the frame memory 30 under the control of a controller 34. At the same time, at the character feature extractor 32, a histogram (also referred to as a feature vector) of the directionality codes shown in FIG. 3 is defined for each of a sub-divided regions of the character frame as shown in FIGS. 4 and 5. The thus created histogram or feature vector is then supplied to the controller 34.

Upon completion of writing of the directionality code arrangement pattern for a particular code into the frame memory 30, the data stored in the frame memory is sequentially read out and input into a decoder 36 under the control of the controller 34. The decoder 36 is connected to a pair of counters 38 and 40, and it increments the count of the counter 38 every time when any of the eight different codes 1 through 8 has been detected and also the count of the counter 40 every time when either of the inclination codes 6 and 8 has been detected. It is to be noted that both of the counters 38 and 40 are cleared by the controller 34 prior to the initiation of read-out operation from the frame memory 30. Upon completion of the read-out operation from the frame memory 30, the count of the counter 38 indicates the total number of the directionality codes found and the count of the counter 40 indicates the number of inclination codes 6 and 8 found. As shown in the system of FIG. 2, a ratio calculator 42 for calculating an inclination ratio is provided as connected between the counters 38 and 40 and the controller 34 and it calculates the ratio of the count of the counter 40 to the count of the counter 38. The resultant ratio is used as a parameter inidicating the degree of inclination of the character in question.

For example, in the case of numeral "7" without inclination shown in FIG. 4, the total number of directionality codes present is equal to 135 and the number of inclination codes 6 and 8 present is equal to 19, so that the ratio is equal to 19/135=0.14. On the other hand, in the case of numeral "7" with inclination shown in FIG. 5, the total number of directionlity codes present is equal to 121 and the number of inclination codes 6 and 8 present is equal to 48, so that the ratio is calculated as 48/121=0.40. It is thus clear that for an inclined character, there are more inclined codes 6 and 8 and thus the inclination ratio is larger. As also shown inthe system of FIG. 2, a table 44 for storing threshold valuess to be used in determination of the presence or absence of inclination for respective characters is provided as connected to the controller 34. Thus, a threshold value corresponding to the character to be processed is read out of the table 44 into the controller 34, and then the threshold value thus read out is then compared with the ratio calculated by the ratio calculator 42, whereby the character is determined to have no inclination if the ratio is smaller than the threshold value; whereas, the character is determined to have an inclination if the ratio is equal to or larger than the threshold value.

In the case when the character has been determined to have no inclination, the controller 34 causes the histogram or feature vector supplied from the character feature extractor 32 as described previously to be stored into a first memory 46A which stores only characters without inclination. On the other hand, if the character has been determined to have an inclination, the controller 34 causes the histogram or feature vector to be stored into a second memory 46B which stores only characters with an inclination.

As described above, in accordance with this aspect of the present invention, a character to be registered is first checked whether it is inclined or not and it is stored into a different memory according to presence or absence of inclination. It is to be noted that the system shown in FIG. 2 has a memory 46 having two separate and distinctive memory areas 46A and 46B with the memory area 46A storing characterd without inclination and the memory area 46B storing characters with inclination. However, two separate memories may be provided for separately storing characters without inclination and characters with inclination. It should thus be understood that this aspect of the present invention for forming character libraries with and without inclination can be advantageously applied to a character recognition system of the type described previously.

A further aspect of the present invention will now be described in detail with reference to FIGS. 6 through 18. This aspect of the present invention relates to a pattern recognition method and system for recognizing a pattern, in particular a character, such as alphanumeric character, Japanese "hiragana" or "katakana" character, or a symbol, at high accuracy even if it is a handwritten pattern. In accordance with this aspect of the present invention, there is provided a method of recognizing a pattern, comprising the steps of: obtaining an unknown pattern in the binary representation, whereby the pattern is represented by one of the binary number and the background is represented by the other of the binary number; assigning one of a plurality of predetermined directionally codes to each of pixels defining a contour of said pattern in accordance with a predetermined rule; calculating said directionally codes assigned to the contour of said pattern; subdividing said pattern into a plurality of mesh regions based of said calcuated value; forming a histogram of said directionality codes for each of said subdivided regions; and comparing said histogram with each of reference histograms of known patterns stored in a library, thereby selecting one of the known patterns having the best similarity to recognize said unknown pattern. As will be appreciated, this aspect of the present invention is very useful for application to each of the embodiments described previously.

Figure 6:
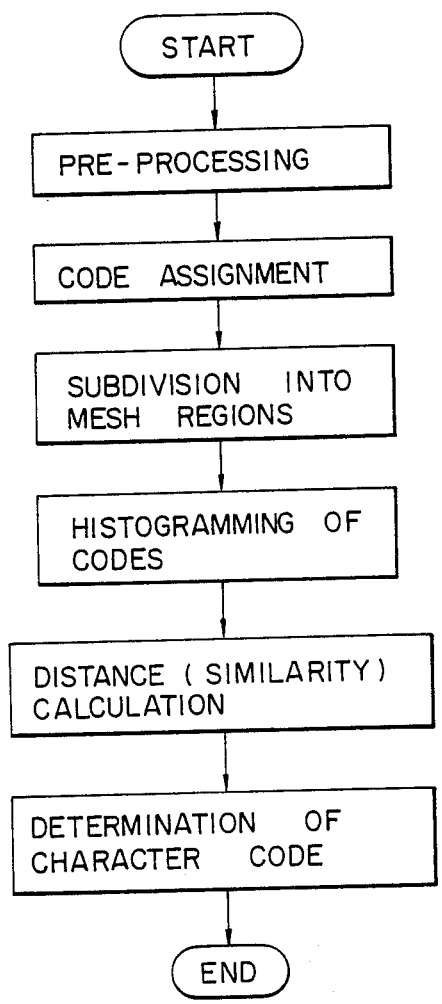
FIG. 6 is a flow chart illustrating the sequence of steps in the process of recognizing a character in accordance with one embodiment of the present invention.
Figure 7:
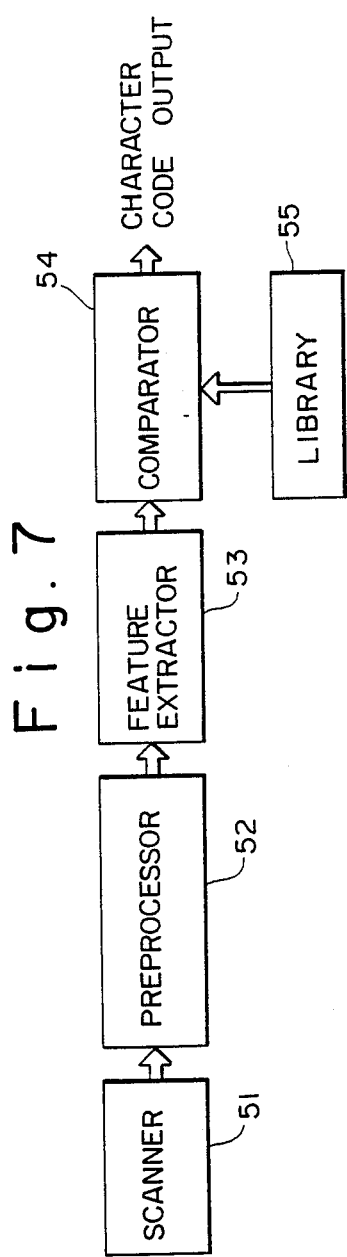
FIG. 7 is a block diagram showing an optical character recognition system for implementing the process shown in FIG. 6.
Figure 8:
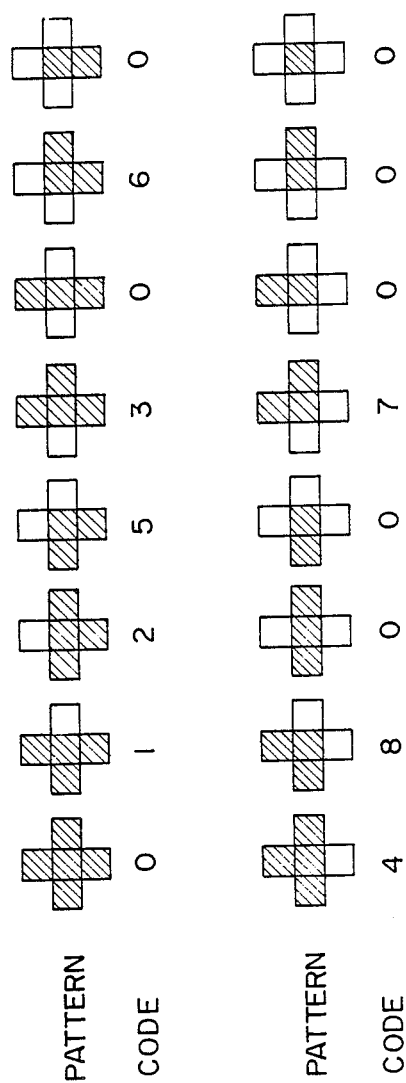
FIG. 8 is a schematic illustration showing a set of directionality codes and associated pixel patterns for processing the black pixels located at the contour of a character to be recognized.
Figure 10:
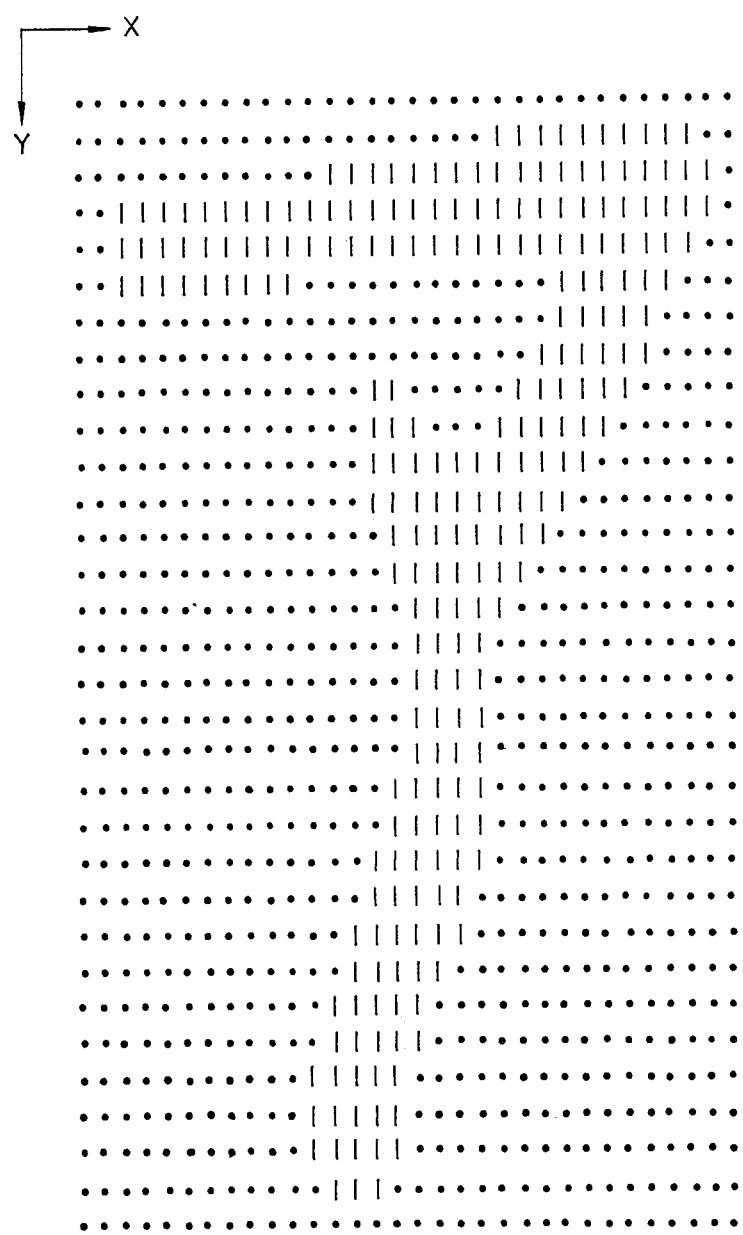
FIG. 10 is an illustration showing the pattern of handwritten Japanese "katakana" character "a" after the pre-processing.

Referring now to FIG. 6, there is shown a flow chart showing the sequence of steps in carrying out the present method of pattern, in particular, character recognition. And, FIG. 7 shows in block form the overall system of a pattern (character) recognition system for practicing the process shown in FIG. 6. An original having thereon at least one character image is optically read by scanner 51 so that visual character is converted into an electrical images signal, which is then processed by a pre-processor 52, in which the electrical image signal is subjected to a thresholding operation, thereby converting the image signal into a pattern in the binary representation. Each of the characters in this pattern is then taken out and subjected to normalization and smoothing. The character pattern in the binary representation is then supplied from the pre-processing unit 52 to a feature extractor 53, where one of a plurality of predetermined directionality codes is assigned to each of the pixels defining the contour of the character pattern. It is to be noted that the contour of a character pattern in the binary representation is defined either by black pixels or by white pixels. Thus, the predetermined directionality codes may be assigned either to those black codes defining the character contour or to those white codes similarly defining the character contour. FIG. 8 shows a set of nine codes and associated sixteen pixel patterns for use in processing of a black character contour; on the other hand, FIG. 9 shows a set of nine codes and associated sixteen pixel patterns for use in processing of a white character contour. In each case, a pixel pattern includes a center pixel which is a pixel of interest, a pair of top and bottom pixels adjacent to the center pixel in a first direction (horizontal direction in the illustrated example) and a pair of left and right pixels adjacent to the center pixel in a second direction (vertical direction in the illustrated example) which is different (perpendicular in the illustrated example) from the first direction. In the case of FIG. 8, the center pixel is always shaded, indicating that it is a black pixel, because this set is to be used for processing a black character contour. On the other hand, the center pixel of the set shown in FIG. 9 is always unshaded, indicating that it is a white pixel, because this is the case of processing a white character contour.

It is to be noted that in the black character contour processing method, if a character to be processed has a portion having a width which is smaller than twice the spacing between the two adjacent dots or pixels, there is a case in which the opposite contours will be commonly represented by only one directionality code; on the other hand, if that portion has a width equal to or larger than twice the pixel-to-pixel spacing, each character contour will be represented by its associated directionality code. Thus, in the former case, the number of directionality codes assigned will be half of the number of directionality codes assigned in the latter case. Accordingly, for a character having a narrow line portion, "thinning" or "narrowing" of a line takes place when processed by the black character contour processing method, so that the extracted feature tends to become unstable. On the other hand, the white character contour processing method is free of such a problem. Thus, the white character contour processing method is not impaired by "line thinning"; conversely, the black character contour processing method is not impaired by "crushing" or "line fattening."

Figure 11:
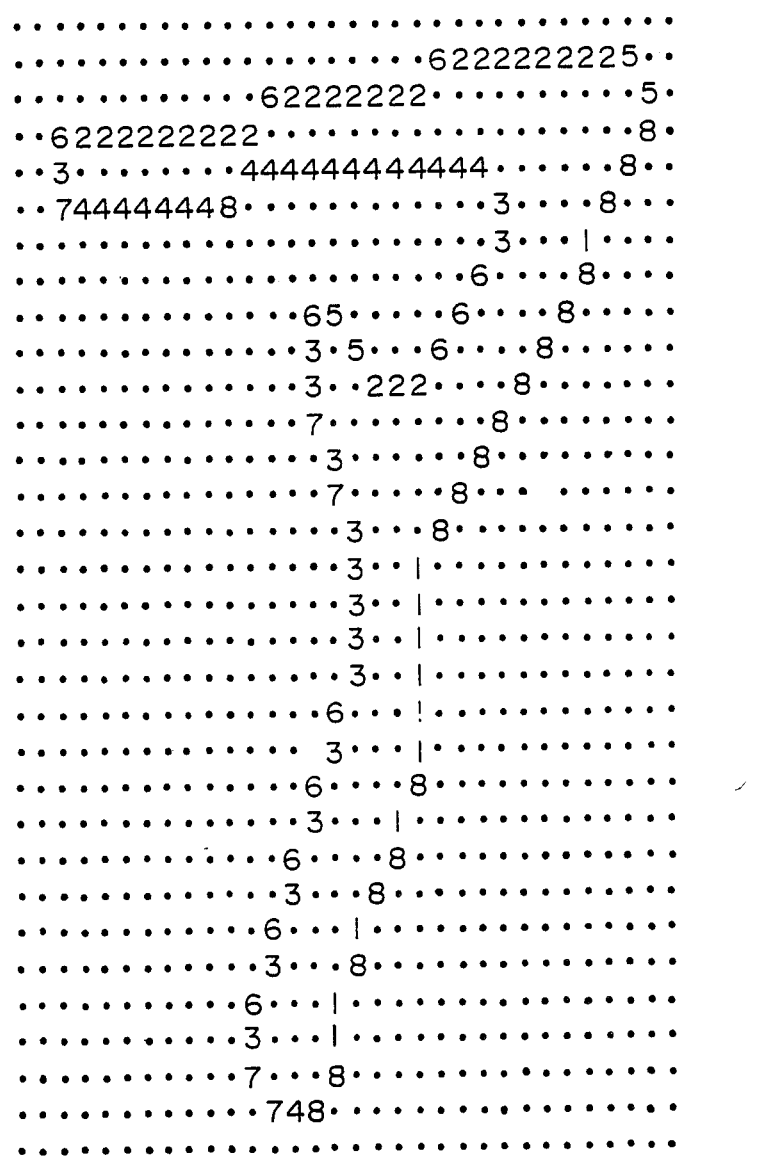

FIG. 5 shows a character pattern of Japanese "katakana" character "a" after the pre-processing. The pattern is defined by the binary representation, and, thus, the katakana "a" is represented by "1s" while the background is represented by "0s" which are, in fact, indicated by dots in FIG. 10. FIG. 11 shows the result when the black character contour processing method has been applied to the pattern of FIG. 10. On the other hand, FIG. 12 shows the result when the white character contour processing method has been applied to the pattern of FIG. 10.

Figure 12:
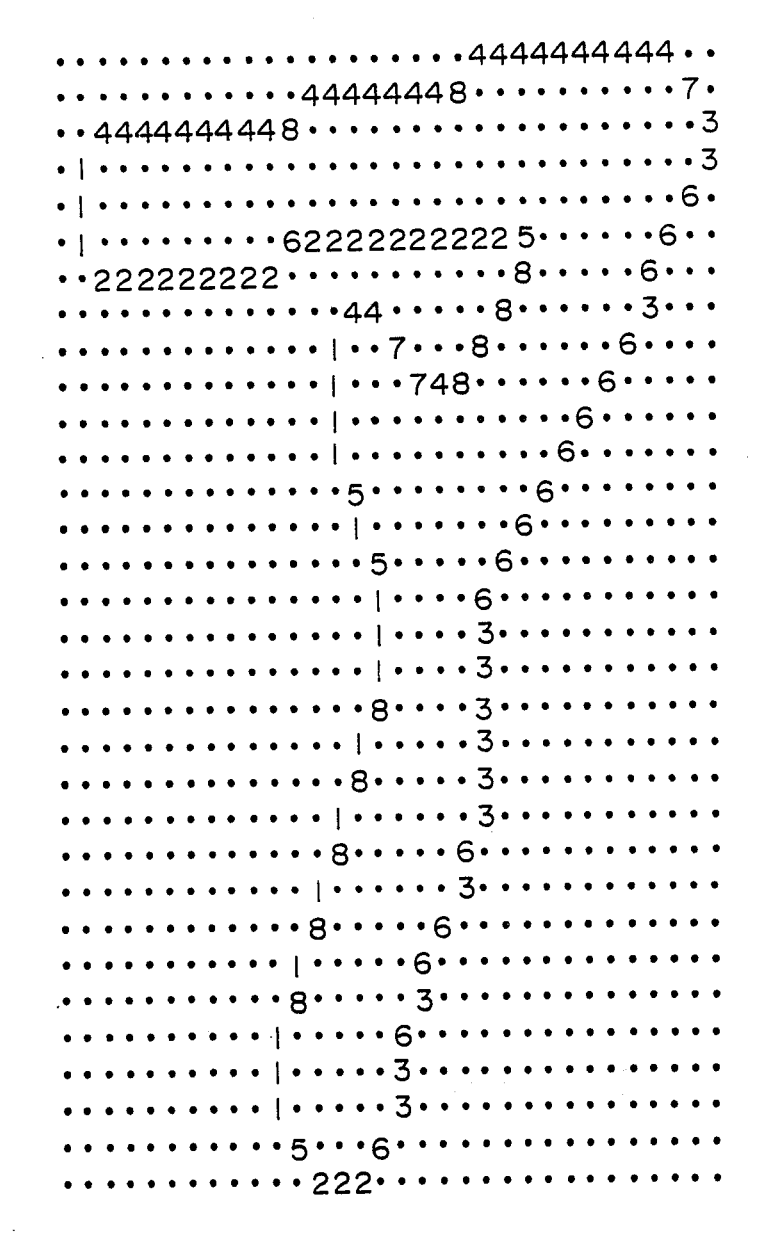

Then, the feature extractor 53 scans the contour pattern defined by the assignment of the directionality codes as shown in FIG. 11 or 12 in X and Y directions to count the directionality codes, and, then, based on the value thus counted, points of subdivision the character frame into regions are determined, thereby subdividing the character frame into a plurality of mesh regions defined by M×N. In this manner, since the subdividing points are determined in accordance with the distribution of the directionality codes assigned to the character contour, the subdivision into mesh regions can be carried out appropriately depending on the degree of deformation a character, especially in the case of a handwritten character. The manner of subdivision processing can be carried out by any of subdivision methods well known to one skilled in the art, so that its detailed description will be omitted.

Then, the feature extractor 53 determines a histogram $H_{kij}$ of the directionality codes for each of the subdivided mesh regions (i,j) as a feature. It should be noted that subscript k denotes one of the directionality codes, so that k is an integer between 1 and 8. Then, the histogram is supplied to a comparator 54 where it is compared with each of the histograms of known characters stored in a library 55, thereby calculating a distance (similarity) between the input character and each of the known characters stored in the library 55 and outputting that known character having the smallest calculated distance and thus the best degree of similarity as a character code output. In this case, if use is made of a simple euclidean distance, a distance d1 between the library histogram $D_{kijl}$ of a known character 1 and the histogram $H_{kij}$ of an input (unknown) character can be expressed as in the following manner.

$$dl = \sum_j \sum_i \sum_k |D_{kijl} - H_{kij}|$$

Now, more specific examples of this aspect of the present invention will be described below.

EXAMPLE 1

In the present example, using the directionality codes and associated pixel patterns shown in FIG. 9, the white character contour processing method is applied to a pre-processed character pattern. Then, the resulting pattern is subdivided into N×N (in general, M×N) mesh regions. The points of subdivision in the X direction is determined by the procedure shown in the flow chart of FIG. 13, and using these subdivision points, the pattern is subdivided into N sections in the X direction. Using a similar procedure, points of subdivision in the Y direction are determined and the pattern is subdivided into N number of sections in the Y direction. As a result, the character pattern having its character contour defined by the directinality codes is subdivided into N×N mesh regions.

Figure 13:
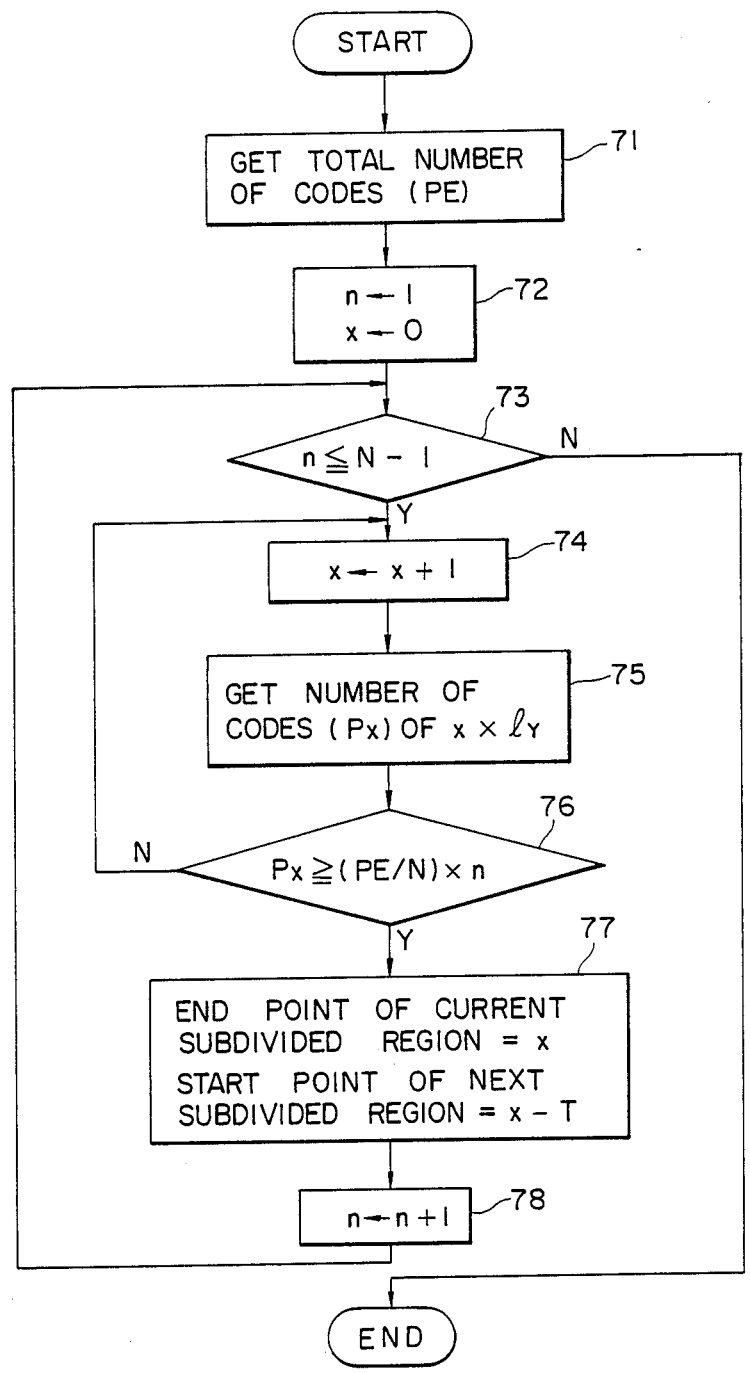
FIG. 13 is a flow chart showing the sequence of steps in the process of subdividing a character area or frame into a plurality of regions in accordance with one embodiment of the present invention.

Referring to the flow chart shown in FIG. 13, the process of subdivision in the X direction will be described more in detail below. By scanning the character pattern, the total number of the assigned directionality codes (PE) is calculated at step 71. Then, as a preparatory step for scanning for the purpose of detecting points of subdivision, a counter x for the number of subdivisions and a counter x for designating the address in the X direction are reset at step 72. From here, the scanning of the character pattern in the Y direction (i.e., raster scanning with the Y direction as a main scanning direction) is carried out while incrementing the X address by +1 until n reaches the value equal to N−1 (in the present example, N=3) so as to detect subdivision points.

Described more in detail in this respect, the process proceeds with adding "1" to x at step 74, scanning a single line designated by the current x in the Y direction, and calculating the number (Px) of the directionality codes present from the beginning of the first line to the end of the current line at step 75. Then, it is determined whether or not Px is equal to or larger than (PE/N)Xn, and if the result is negative, then the process returns to step 74 for processing the next line. On the other hand, if the result of the determination at step 76 is affirmative, then the process proceeds to step 77, where the current value of x is detected as an X address end point of the current subdivided region (i.e., right-hand subdivision point of a subdivided region). In addition, a value obtained by subtracting the value of T (i.e., overlapping of subdivided regions) from the value of x is detected as X address of the start point for the next subdivided region (i.e., left-hand subdivision point of a subdivided region) It is to be noted that the start point of the first subdivided region corresponds to the left-hand side of the character frame, i.e., x=1, and the end point of the last subdivided region corresponds to the right-hand side of the character frame, i.e., x=Lx. Thereafter, "1" is added to n at step 78 and the then the process goes back to step 73. Such a process is repeated until the condition of n=N−1 is attained at step 73.

The detection of subdivision points in the Y direction is carried out in a similar manner. In this case, however, since the total number PE of the directionality codes has already been calculated, it is not calculated again. The scanning for detecting subdivision points is carried out in the X direction while incrementing the Y address by +1, during which the determination processing similar to step 76 et seq. is carried out regarding the number of directionality codes $P_y$ (corresponding to the previous $P_x$), thereby determining the subdivision points in the Y direction. It is to be noted that the start point of the first subdivided region corresponds to the top side (i.e., y= 1), and the end point of the last subdivided region corresponds to the bottom side (i.e., y=Ly).

Figure 14:
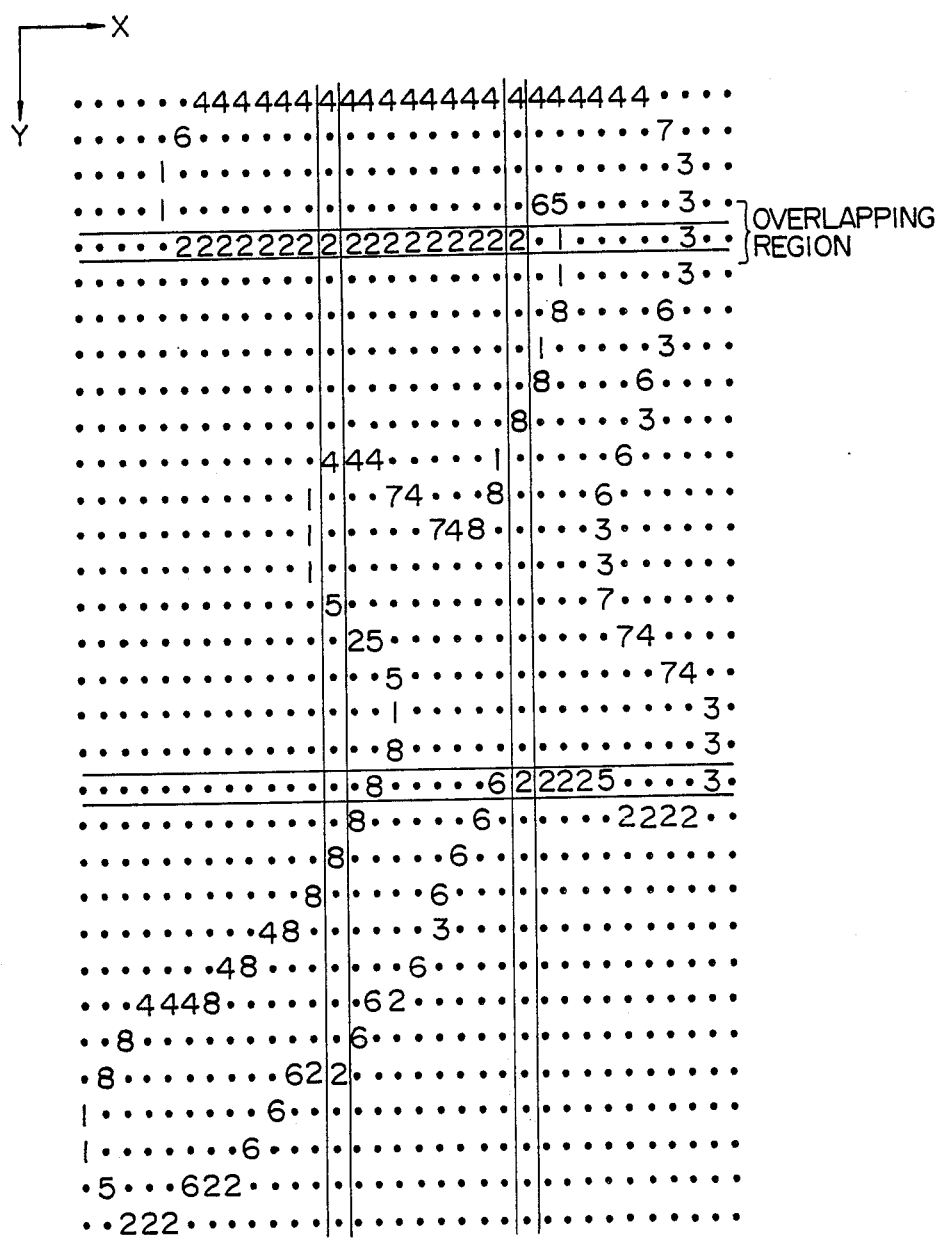
FIG. 14 is an illustration showing the result of subdivision of a character area for Japanese katakana character "nu" into a plurality of regions.
Figure 15:
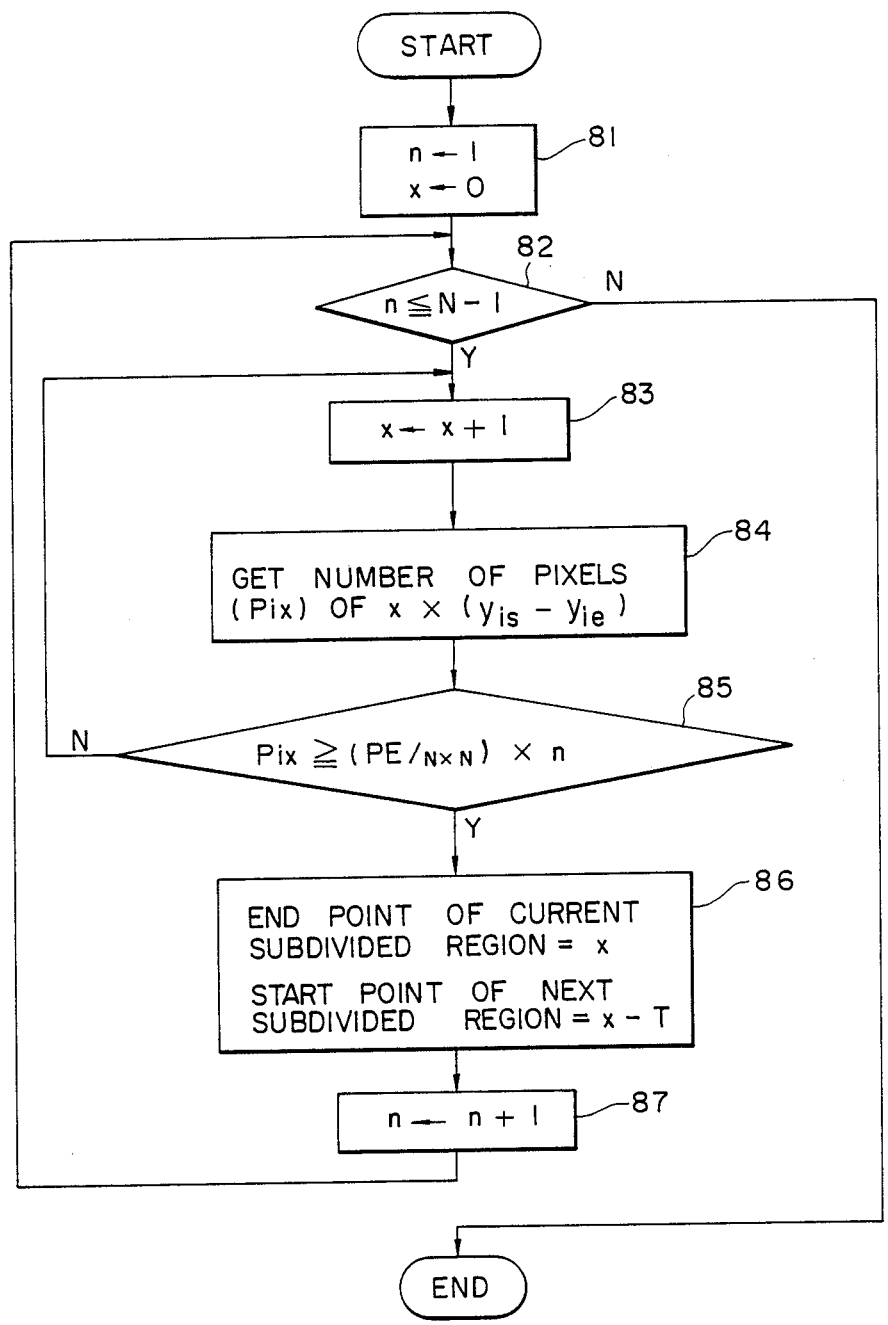
FIG. 15 is a flow chart showing the sequence of steps in the process of subdividing a character area into a plurality of regions in accordance with another embodiment of the present invention.

Using the subdivision points thus obtained, the character pattern is is divided into N subdivisions in the X direction as well as in the Y direction, so that the character pattern is subdivided into a plurality of N×N mesh regions. FIG. 14 shows an example in which the contour pattern of a handwritten katakana character "nu" is divided into a plurality of N x N mesh regions (Lx=1y=32). It is to be noted that this is the case in which the overlapping region or amount T of the two adjacent mesh regions is set at "1." In the katakana character, "nu" and "su" are very similar and the critical clue for differentiating them is a stroke going down right as obvious for one skilled in the katakana character, and, thus, it is critical that this feature is properly reflected in a mesh region. The present example allows to meet such requirement and thus to properly recognize the difference between two similar characters, such as "nu" and "su" in the katakana character.

EXAMPLE 2

In this example, similarly with the previously described Example 1, use is made of the white character contour processing method for assignment of the directionality codes to the contour of a character to be identified. Regarding subdivision into mesh regions, in a procedure similar to that of the previously described Example 1, the character pattern is first subdivided into N number of sections in the Y direction. And, then, the subdivision into N sections takes place in the X direction, which will be described with reference to the flow chart shown in FIG. 15. In the first place, the counter n for the number of subdivisions and the counter x for designating the address in the X direction are cleared at step 81. Then, it is determined whether or not n is equal to or smaller than N−1 (N=3 in the present example) at step 82, and if the result is negative, then the subdivision processing terminates. On the other hand, if the result of the determination step 82 is affirmative, then the scanning in the Y direction is carried out while incrementing the X address by +1 a step 83, thereby counting the number of feature pixels within each of the subdivided regions i in the Y direction at step 84 according to the formula of $P_{ix} = x \times (Y_{is} - Y_{ie})$, and, then, it is determined whether or not the calculated value $P_{ix}$ is equal to or larger than PE/(NXN)Xn at step 85. It is to be noted that $Y_{is}$ and $Y_{ie}$ are the Y addresses of the start and end points of a Y direction subdivided region i, respectively.

Figure 16:
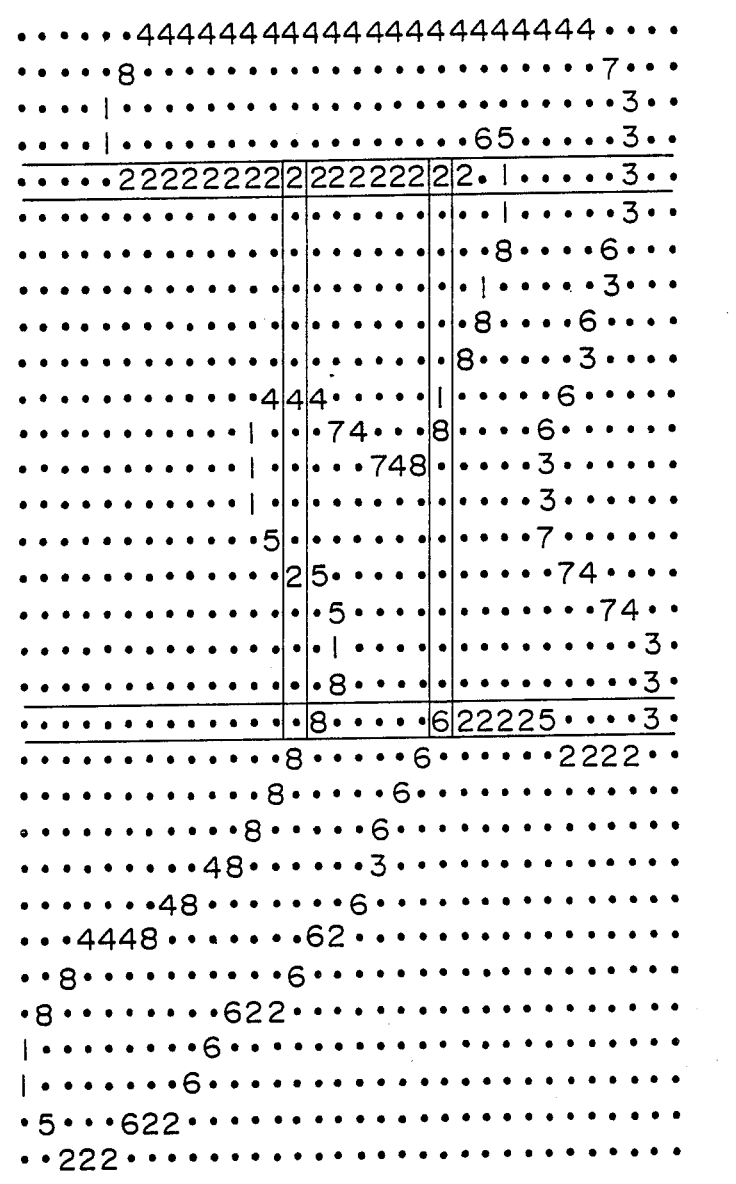

If the result of the determination at step 85 is affirmative, then the current value of x (X address) if detected as the end point of the nth X direction subdivided region, and, at the same time, x−T, where T is a region overlapping amount, is detected as the start point of the next subdivided region at step 86. Then, n is incremented by +1 at step 87, and it process returns to step 82. Using the subdivision points thus obtained, the character pattern is subdivided into N segments in the X direction, so that the character pattern as a whole is subdivided into a plurality (N×N) of regions FIG. 6 shows an example when the character pattern having katakana "nu" defined by its contour by the directionality codes is subdivided according to the method of the present example. It is to be noted, however, that only the result of the subdivisions in the X direction for the intermediate Y direction region is shown in FIG. 16 and it is set such that T=1. It should also be noted that in the above-described example, the subdivisions in the Y direction have been carried out using the method described in the Example 1; however, upon completion of subdivisions in the X direction, the subdivisions in the Y direction may also be carried out in a procedure similar to that shown in the flow chart shown in FIG. 15 for each of the subdivided regions.

EXAMPLE 3

In the case in which T is not set equal to 0 in the Example 2 or in which the directionality codes are crowded in the X or Y direction at a subdivision point, there is a chance that the subdivision of regions is inaccurate. In order to avoid such a problem, in accordance with the present example, upon completion of subdivisions in the X (or Y) direction by the method described in Example 1, the number PEi of feature pixels in the subdivided region i is again calculated, and the subdivisions of a subdivided region i in the Y (or X) direction are carried out using PEi/N instead of PE/N² of example 2.

Figure 17:
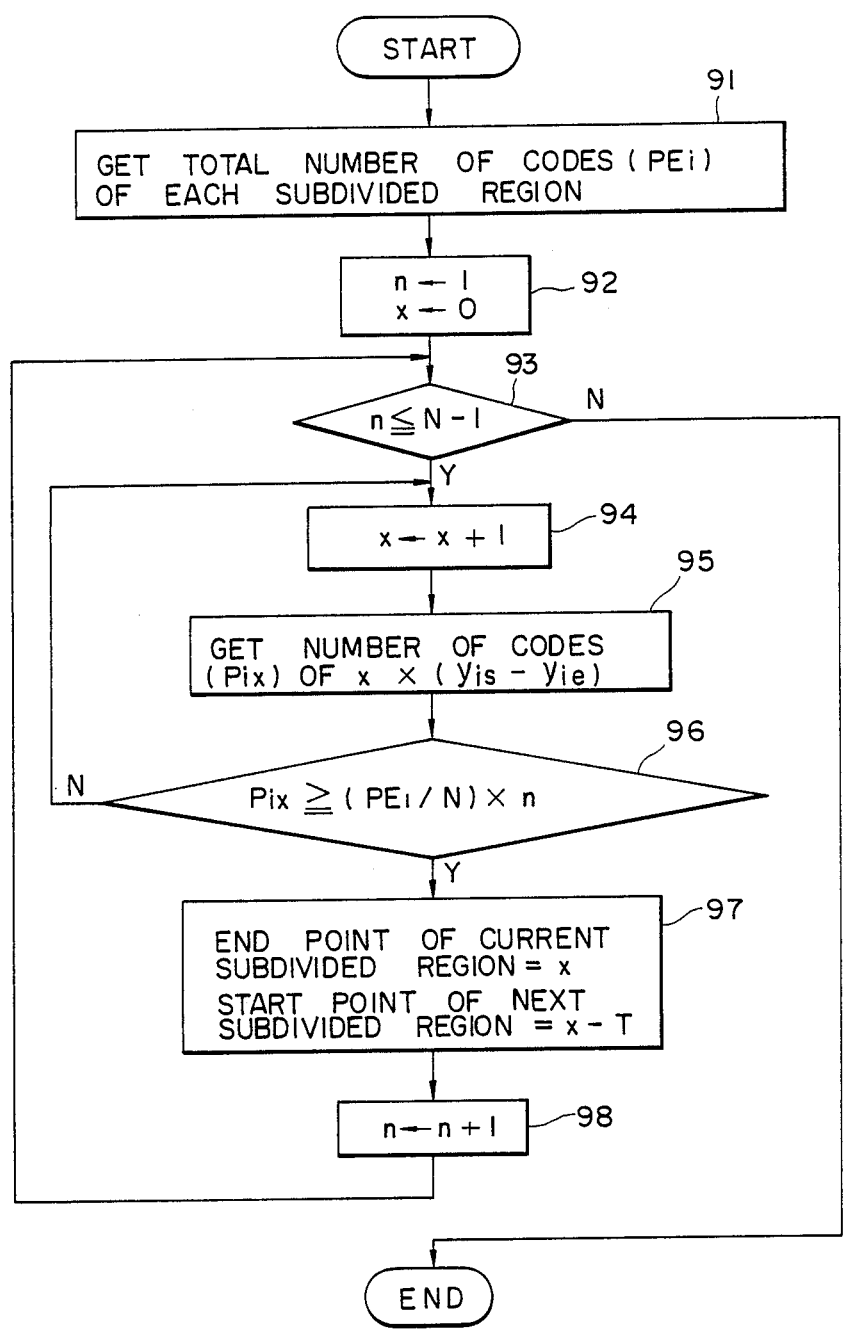
FIG. 17 is a flow chart showing the sequence of steps in the process of subdividing a character area into a plurality of regions in accordance with a further embodiment of the present invention.

The process of first subdividing the character pattern in the Y direction according to the method described in Example 1 and then subdividing each of the subdivided regions in the X direction will be described below with reference to the flow chart illustrated in FIG. 17.

In the first place, by scanning the character pattern, the number PEi of feature pixels of each of the subdivided regions i in the Y direction is calculated at step 91. And, then, the counter n and the counter x are cleared at step 92. Then, it is determined whether or not n is equal to or smaller than N−1 (here, N=3), and if the result is negative, the process terminates at step 93. On the other hand, if the result is affirmative, then the scanning in the Y direction is carried out while incrementing the X address by +1 at step 94, thereby calculating the number of directionality codes within each of the Y direction subdivided regions i according to the formula of $P_{ix} = \times X (Y_{is} - Y_{ie})$ at step 95. Then, it is determined as to whether $P_{ix}$ equal to or larger than PEi/NXn at step 96. It is to be noted that $Y_{is}$ and $Y_{is}$ are the X addresses of the start and end points of each of the Y direction subdivided regions i, respectively.

Figure 18:
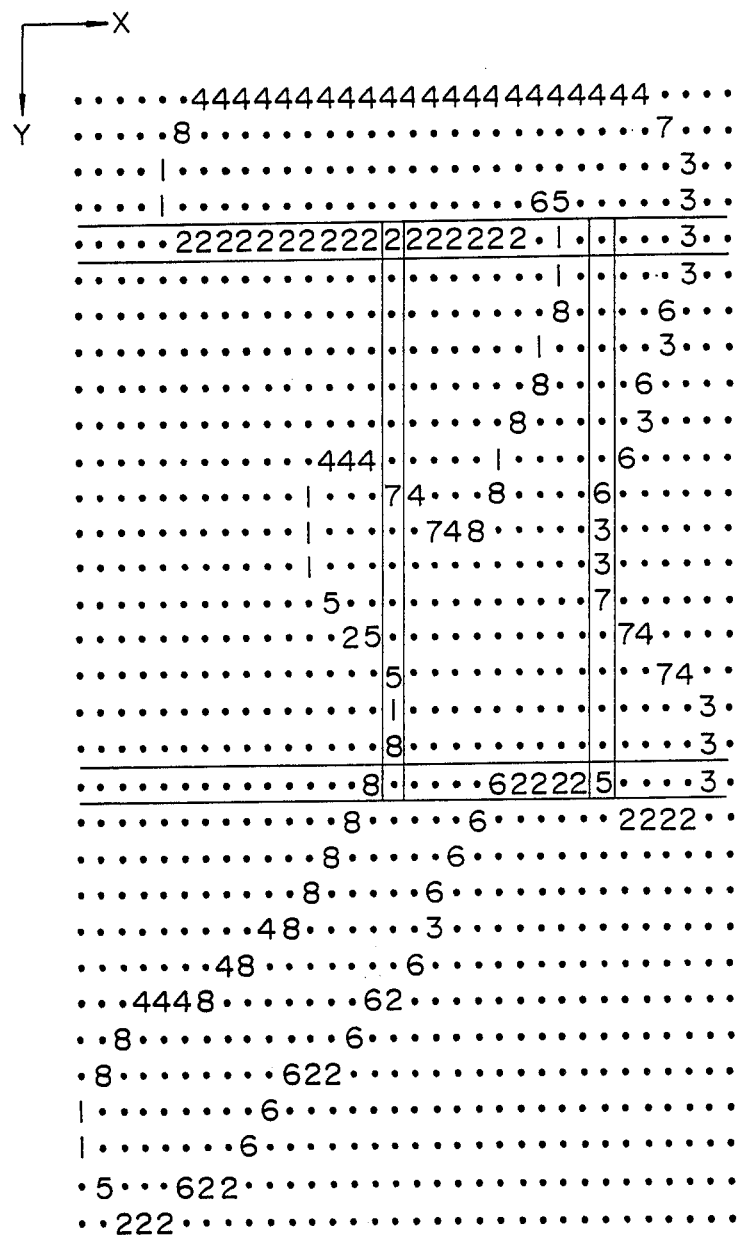

If the result of the step 96 is affirmative, then the current value of x (X address) is detected as the end point of the nth subdivided region in the X direction for the Y direction subdivided region, and, at the same time, x−T (T is a region overlapping amount) is detected as the start point of the next subdivided region at step 97. And, then, n is incremented by +1 at step 98 and then the process returns to step 93. Using the subdivision points in the X direction thus obtained, the Y direction subdivided region is divided into N subdivisions in the X direction, so that the character pattern as a whole is subdivided into a plurality (N×N) of mesh regions. FIG. 18 shows the result when the character pattern having katakana "nu" whose contour is defined by the directionality codes is subdivided according to the above-described procedure with T=1. It is to be noted that the result of subdivisions in the X direction for the intermediate Y direction subdivided region is shown only.

EXAMPLE 4

This example is very similar to the previously described Example 1 excepting that use is made of the black character contour processing method is used instead of the white character contour processing method used in Example 1.

EXAMPLE 5

This example is very similar to the previously described Example 2 excepting that use is made of the black character contour processing method is used instead of the white character contour processing method used in Example 2.

This example is very similar to the previously described Example 3 excepting that use is made of the black character contour processing method is used instead of the white character contour processing method used in Example 3.

It should be noted that the process described above may be implemented partly or wholly by hardware, software, or combination thereof with ease.

As described above, in accordance with this aspect of the present invention, since the subdivision of a character pattern is carried out optimally according to the nature of the character and a feature (histogram of directionality codes) can be extracted stably without being affected by deformations of a character as in the case of a handwritten character, any type of characters can be identified at high accuracy. Besides, since the present invention is simple in structure, it can be implemented with a relatively simple device for carrying out character recognition.

While the above provides a full and complete disclosure of the preferred embodiment of the present invention, various modifications, alternate constructions and equivalents may be employed without departing from the true spirit and scope of the invention. Therefore, the above desciption and illustration should not be construed as limiting the scope of the invention as defined by the appended claims.

What is claimed is:

1. A character recognition system comprising:
    reading means for optically reading a character to be recognized;
    processing means for processing character data supplied from said reading means, said processing means processing said character data to produce a character feature of said character to be recognized in accordance with a predetermined manner;
    storing means for storing a first plurality of reference characters without inclination in the form of said character feature and a second plurality of reference characters with inclination in the form of said character feature;
    comparing means for comparing said character to be recognized with at least one of said reference character stored in said storing means and determining a degree of similarity between the two characters compared, and comparing means having a first mode of operation in which both of said first and second pluralities of reference characters are used and a second mode of operation in which only one of said first and second pluralities of reference characters is used; and
    control means for controlling a mode of operation of said comparing means between said first and second modes of operation.

2. The system of claim 1 wherein said control means causes said comparing means to operate in said first mode of operation until a predetermined condition is met and then to operate in said second mode of operation.

3. The system of claim 2 wherein said control means includes a first counter associated with said first plurality of reference characters and a second counter associated with said second plurality of reference characters, whereby a count of either one of said first and second counters is incremented when a reference character having a best degree of similarity has been found from the corresponding one of said first and second plurality of reference characters during said second mode of operation.

4. The system of claim 3 wherein said control means monitors a difference of counts between said first and second counter and switches from said first mode of operation to said second mode of operation when said difference has reached a predetermined value, whereby that of said first and second plurality of reference characters which correspond to either one of said first and second counter having a larger count is selected for use in said second mode of operation.

5. The system of claim 3 wherein said control means switches from said first mode of operation to said second mode of operation upon completion of recognition operations for a predetermined number of times in said first mode of operation, whereby that of said first and second plurality of reference characters which correspond to either one of said first and second counters having a larger count is selected for use in said second mode of operation.

6. The system of claim 2 wherein said control means causes said comparing means to return to said first mode of operation upon occurance of rejection.

7. The system of claim 1 wherein said character feature is a contour of character.

8. A system for forming a character library for use in character recognition, comprising:
processing means for processing an optically read charcter by assigning one of a plurality of predetermined directionality codes to each pixel along a contour of said character;
calculating means for calculating a ratio of a number of at least selected one of said predetermined directionality codes assigned to a total number of said directionality codes assigned;
determining means for determing whether said character is inclined or not by comparing said calculated ratio with a predetermined value; and
storing means for storing said character into a first group of characters without inclination or a second group of characters with inclination.

9. The system of claim 8 wherein each of said directionality codes has an associated pattern including a center pixel, a pair of top and bottom pixels adjacent to said center pixel vertically and a pair of right and left pixels adjacent to said center pixel horizontally.

10. The system of claim 9 wherein said selected code includes a code having an associated pattern whose top and left pixels are black and a code having an associated pattern whose bottom and right pixels are black.

11. The system of claim 8 wherein said processing means includes a frame memory for temporarily storing a contour pattern defined by said directionality codes, a first counter for counting the total number of said directionality codes present in said pattern stored in said frame memory and a second counter for counting the number of said at least selected one of said directionality codes present in said pattern stored in said frame memory.

12. A character recognition method, comprising the steps of:
obtaining a character pattern of an unknown character, which represents a character by one of the binary number and a background by the other of the binary number;
assigning one of a plurality of predetermined directionality codes to each of pixels defining a contour of said character;
subdividing said character pattern into a plurality of mesh regions while determining points of subdivisions by counting said assigned directionality codes while scanning said character pattern in a first direction and a second direction different from said first direction;
determining a histogram of said directionality codes for each of said mesh regions; and
comparing said histogram with each of histograms of known characters to determine the identification of said unknown character.

13. The method of claim 12 wherein said subdividing step includes a step of counting a total number PE of the assigned directionality codes and a step of counting the assigned directionality codes by scanning said character pattern in said second or first direction while incrementing by 1 in an address of said first or second direction, whereby the addresses in the first or second direction when said count becomes equal to $PE/NX1$, $PE/NX2$, ..., $PE/NX(N-1)$ are determined as subdivision points, thereby causing said character pattern to be divided into N subdivisions in the first or second direction.

14. The method of claim 12 wherein said subdividing step includes a step of counting a total number PE of the assigned directionality codes; a step of counting the assigned directionality codes by scanning the character pattern in said second or first direction while incrementing by 1 in an address of said first or second direction, whereby the addresses in the first or second direction when said count becomes equal to $PE/NX1$, $PE/NX2$, ..., $PE/NX(N-1)$ are determined as subdivision points, thereby causing said character pattern to be divided into N subdivisions in said first or second direction; and a step of counting the assigned directionality codes by scanning the character pattern in said first or second direction while incrementing by 1 in an address of said second or first direction for each of said N subdivisions in said first or second direction, whereby the addresses in the second or first direction when said count becomes equal to $PE/(NXM) \times 1$, $PE/(NXM) \times 2$, ..., $PE/(NXM) \times (M-1)$ are determined as subdivision points, thereby causing each of said N subdivisions in said first or second direction to be divided into M subdivisions in said second or first direction, so that, in effect, said character pattern as a whole is subdivided into NXM mesh regions.

15. The method of claim 12 wherein said subdividing step includes a step of counting a total number PE of the assigned directionality code; a step of counting the assigned directionality codes by scanning said character pattern in said second or first direction while incrementing by 1in an address of said first or second direction, whereby the addresses in the first or second direction when said count becomes equal to $PE/NX1$, $PE/NX2$, ..., $PE/NX (N-1)$ are determined as subdivision points, thereby causing said character pattern to be divided into N subdivisions in the first or second direction; a step of counting a total number $PE_i$ of said assigned directionality codes in each region i of said subdivided regions in the first or second direction; and a step of counting the assigned directionality codes by scanning in said first or second direction while incrementing by 1 in an address in said second or first direction in each region i of said subdivided regions in the first or second direction, whereby the addresses in the second or first direction when said count becomes equal to $PE_i/MX1$, $PE_i/MX2$, $PE_i/MX(M-1)$ are determined as subdivision points, thereby causing each region i of said subdivided regions in the first or second direction to be divided into M subdivisions in the second or first direction, so that, in effect, said character pattern as a whole is subdivided into NXM mesh regions.

16. The method of claim 12 wherein said first and second directions are X and Y directions which are normal to each other.

* * * * *